(12) United States Patent
Giertz et al.

(10) Patent No.: US 9,458,824 B2
(45) Date of Patent: Oct. 4, 2016

(54) METHOD FOR CONTROLLING A WIND TURBINE

(71) Applicant: Wobben Properties GmbH, Aurich (DE)

(72) Inventors: Helge Giertz, Leer (DE); Wolfgang de Boer, Moormerland (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 14/353,225

(22) PCT Filed: Oct. 17, 2012

(86) PCT No.: PCT/EP2012/070601
§ 371 (c)(1),
(2) Date: Apr. 21, 2014

(87) PCT Pub. No.: WO2013/060613
PCT Pub. Date: May 2, 2013

(65) Prior Publication Data
US 2014/0246857 A1 Sep. 4, 2014

(30) Foreign Application Priority Data

Oct. 24, 2011 (DE) .......................... 10 2011 085 107

(51) Int. Cl.
| | |
|---|---|
| G08B 21/00 | (2006.01) |
| F03D 3/00 | (2006.01) |
| F03D 7/02 | (2006.01) |
| F03D 7/04 | (2006.01) |

(52) U.S. Cl.
CPC ............... *F03D 3/00* (2013.01); *F03D 7/0264* (2013.01); *F03D 7/048* (2013.01); *F03D 17/00* (2016.05); *F03D 80/40* (2016.05); *Y02E 10/722* (2013.01); *Y02E 10/723* (2013.01)

(58) Field of Classification Search
CPC .... F03D 11/0091; F03D 3/00; F03D 7/0264; F03D 7/00; F03D 7/02
USPC .................... 340/540; 290/44, 55; 73/112.01
See application file for complete search history.

(56) References Cited

U.S. PATENT DOCUMENTS

| | | | |
|---|---|---|---|
| 6,785,637 B1 * | 8/2004 | Wobben .................. | 702/188 |
| 6,966,754 B2 * | 11/2005 | Wobben .................. | 416/61 |
| 8,433,541 B2 * | 4/2013 | Altemark ............... | 702/184 |
| 8,546,967 B2 * | 10/2013 | Ormel et al. ............ | 290/44 |
| 8,660,706 B2 | 2/2014 | Szemkus | |
| 2002/0029097 A1 * | 3/2002 | Pionzio et al. .......... | 700/286 |

(Continued)

FOREIGN PATENT DOCUMENTS

| | | |
|---|---|---|
| DE | 199 48 194 C2 | 4/2001 |
| DE | 101 15 267 C2 | 10/2002 |
| DE | 10 2009 004 385 A1 | 7/2010 |
| DE | 10 2008 046 156 A1 | 11/2010 |
| EP | 1 906 192 A2 | 4/2008 |

(Continued)

*Primary Examiner* — Eric M Blount
(74) *Attorney, Agent, or Firm* — Seed Intellectual Property Law Group PLLC

(57) ABSTRACT

One embodiment of the invention relates to a method for controlling a wind turbine, having the steps of detecting an internal fault signal which is generated in the first wind turbine and which indicates a disruption of the first wind turbine; receiving at least one external fault signal which is generated outside of the first wind turbine and which indicates a disruption of another wind turbine; and evaluating the internal fault signal dependent on the at least one external fault signal.

16 Claims, 3 Drawing Sheets

(56) References Cited

U.S. PATENT DOCUMENTS

| | | | |
|---|---|---|---|
| 2008/0078228 A1* | 4/2008 | Nies | 73/1.01 |
| 2009/0110539 A1* | 4/2009 | Uphues | 415/13 |
| 2010/0332272 A1* | 12/2010 | Ong et al. | 705/7 |
| 2011/0054825 A1* | 3/2011 | Perla et al. | 702/113 |
| 2011/0098975 A1* | 4/2011 | Mazzaro et al. | 702/183 |

FOREIGN PATENT DOCUMENTS

| | | |
|---|---|---|
| EP | 2 267 305 A2 | 12/2010 |
| JP | 11-89093 A | 3/1999 |
| JP | 2010-518296 A | 5/2010 |
| RU | 2305204 C2 | 8/2007 |
| SU | 1373862 A1 | 2/1988 |

* cited by examiner

METHOD FOR CONTROLLING A WIND TURBINE

BACKGROUND

1. Technical Field

The present invention concerns a method of controlling a wind power installation and a method of controlling a plurality of wind power installations. The invention further concerns a wind power installation and a wind park with a plurality of wind power installations.

2. Description of the Related Art

Wind power installations are generally known, in their structural configuration which is usual nowadays they convert kinetic energy of the wind into a motion energy of an aerodynamic rotor. The motion energy is converted by means of a generator into electric energy or electric power when a snapshot is considered. A generally conventional wind power installation is shown in FIG. 1.

In regard to controlling a wind power installation care is also to be taken to ensure that any disturbances in the wind power installation are counteracted to exclude or reduce consequential damage to the wind power installation and/or endangerment, in particular danger to people. For that purpose faults in the wind power installation are monitored in order to possibly initiate protective measures.

For example a fire in the pod of the wind power installation can be detected by a smoke sensor. The wind power installation can then be stopped and extinguishing processes may be initiated. If an optical smoke alarm is used then that can lead to a false alarm if the visibility conditions are poor for reasons other than due to smoke such as for example due to dust or ice crystals.

A further example is monitoring the noise of the wind power installation, which can be provided for example at the spinner, that is to say in the region of the cover on the rotor hub. Such noise monitoring can detect unusually loud noises, which can point to an existing damage or a threat of damage, in particular a mechanical malfunction. In that case the wind power installation—which hereinafter can also be referred to for simplicity by its synonym of installation—is stopped and service personnel informed. In this case also a false alarm can occur, if for example a heavy hailstorm hits the wind power installation including the spinner and as a result leads to an unusually high noise level.

These are just two examples of monitoring systems in the wind power installation, which can lead to a false alarm. If such a false alarm occurs the consequence of this can be a reduction in output due to unwanted stoppage of the wind power installation. On the other hand much greater damage to a wind power installation or due to a wind power installation can occur if the specified or other warning signals are not noted while no false alarm is involved.

BRIEF SUMMARY

One or more embodiments of the invention address one or more of the above-mentioned problems. In particular one embodiment seeks to provide a solution for more reliably recognizing fault signals and avoiding false alarms without ignoring or overlooking correctly generated fault signals. One embodiment at least seeks to provide an alternative configuration.

According to one embodiment of the invention there is proposed a method of controlling a wind power installation according to claim 1. In accordance therewith a fault signal produced internally in the respective wind power installation to be controlled is detected. That fault signal indicates a disturbance in the wind power installation such as for example the suspicion of a fire in the wind power installation or the suspicion of damage to a mechanical component. Hereinafter reference will be made for the purposes of description in particular to those two situations, namely fault signals or fault messages concerning a fire situation and fault signals or fault messages concerning damage indicated by a loud noise. Nonetheless the invention is not limited to those two basic situations of use.

The statement that the fault signal which basically can also be referred to as a fault message indicates a disturbance in the wind power installation is to be interpreted as meaning that there is a suitable fault criterion such as for example the response on the part of a smoke alarm or the response on the part of a sound sensor. The fact that the fault signal indicates the disturbance in question also includes the possibility that however the fault is actually not present. The fault signal can be the result of a sensor or also a plurality of sensors, or other conditions such as for example operating conditions can be evaluated. Equally there can be a plurality of fault signals at the same time for different disturbances.

In addition an external fault signal can be received at the wind power installation. An external fault signal is a signal indicating trouble with another wind power installation. In particular such an external fault signal relating to trouble with an external, that is to say other, wind power installation is, in respect of that other wind power installation, an internal fault signal which however is also transmitted to that first wind power installation. By virtue of such signal transmission it becomes an external fault signal for the first wind power installation.

The internal fault signal is now evaluated by the first wind power installation, in dependence on the at least one external fault signal. Accordingly evaluation of the internal fault signal is not limited to that internal fault signal but also takes account of at least one external fault signal, more specifically and in particular a signal which respectively concerns the same disturbance or kind of disturbance as the internal fault signal in order first to deduce therefrom whether there is or is not a fault disturbance.

Preferably a protective measure for protecting the wind power installation, in particular stopping the installation, is initiated in dependence on the internal fault signal and also in dependence on the at least one external fault signal. Therefore initiating a protective measure is not limited to evaluation of the internal fault signal. Accordingly the one or more external fault signals taken in consideration can then possibly decide whether a disturbance situation is or is not assumed to be occurring. Besides stopping the wind power installation, other protective measures are also considered such as for example triggering an extinguishing process if the fault signal concerns a fire situation, to give just one further example.

In an embodiment it is proposed that, upon evaluation of the internal fault signal, it is assumed that a disturbance is not present if the internal fault signal indicates a disturbance and at least one further external fault signal also indicates a similar disturbance, namely a disturbance in respect of the respective wind power installation in relation to which said external fault signal is an internal fault signal. If for example an internal fault signal occurs at the first wind power installation, which indicates a fire, in particular triggered by a smoke detector in the first wind power installation, it is firstly to be assumed that this involves a fire situation. If now an external fault signal from another, for example second, wind power installation occurs, which also indicates a fire, more specifically a fire in the second wind power installation, that can be an indication of a false alarm. More specifically according to one embodiment of the invention it is recognized that it is improbable that a fire occurs in two wind power installations at the same time. Rather, in such a case it can be assumed that the smoke detectors which respectively produced the fire warning signal as a fault signal have been triggered by factors other than a fire, namely by factors which according to experience and/or more reasonably are to be expected for a plurality of wind power installations at the same time. That is the case for example with a sand storm. If a sand storm is occurring, the visibility conditions can worsen causally at the same time at a plurality of wind power installations which are in the immediate proximity of each other.

Such a phenomenon can also occur for other disturbances such as for example in respect of noise monitoring. If an internal fault signal in the first wind power installation signifies an excessively high noise level that can indicate a mechanical problem such as for example bearing damage. More specifically the noise sensors are designed primarily or usually for detecting loose parts and thus sporadically occurring noises. If however an external fault signal, for example in a second wind power installation, signals almost at the same time that there is also an excessively high noise level, it is improbable that both wind power installations have at the same time mechanical damage producing a loud noise. Thus it is in particular improbable that a part is loose in both wind power installations at the same time. Instead, the simultaneous occurrence of a loud noise at a plurality of wind power installations which are in close proximity with each other can rather point to for example a hail situation. A hail situation usually does not occur in isolation at a single wind power installation but occurs for example almost at the same time in an entire wind park.

This therefore involves the initially surprising realization that the presence of a plurality of similar fault signals or fault signals for a plurality of similar disturbances rather indicates that such a disturbance is precisely not occurring then. That realization is taken into account and suitably implemented by the described methods.

In accordance with a configuration there is thus proposed a method wherein if the internal fault signal indicates a disturbance in the first wind power installation a protective measure, in particular stoppage of the wind power installation is initiated if the received external fault signal or initially one or more of the received external fault signals does not indicate a similar disturbance in the respective other wind power installation. If the received external fault signal or one of the received external fault signals however indicates a similar disturbance in the other wind power installation in question, then a warning and in particular a warning signal is produced, without a protective measure being initiated. As explained the additional evaluation of at least one external fault signal can point to the fact that, in spite of the presence of an internal fault signal, the disturbance indicated thereby is improbable. The stated disturbance is in that case nonetheless not out of the question and the presence of a warning signal in that case gives the possible option of further analyzing in detail the respective underlying situation.

An analysis of such a situation—which can also possibly be implemented without the existence of a stated warning signal—can be effected for example in automated mode by the wind power installation or its control or a central control. In that case for example further sensor data such as for example the temperature of a temperature sensor are evaluated. Additionally or alternatively analysis can be effected manually. In particular a reason for the internal fault signal can be found on the basis of known weather or environmental conditions or also from other empirical values in order to be certain that the indicated disturbance is not present. Equally in the analysis it can turn out that the indicated disturbance is nonetheless present, contrary to expectation.

Preferably such a warning signal is transmitted to a control center or produced by same. Preferably in that case the warning signal can include information about the fault signals, namely the one or more internal fault signals or the one or more external fault signals. That information can be suitably used for finding out the actual cause of the respective fault signals.

Preferably a so-called SCADA is used, the abbreviation of which originates from English and is the abbreviation of "Supervisory Control and Data Acquisition" and is nonetheless familiar in German linguistic usage. Such a data system is used in relation to wind power installations to transmit measurement and control data between individual wind power installations and also to a control system. The corresponding fault signals can be provided on that SCADA system. Accordingly each wind power installation which suitably participates in that system also makes its internal signals available to the SCADA as external fault signals. Preferably in that respect the respective fault signal not only includes its nature but also its origin, namely the wind power installation from which it originates. In that way the fault signals, in particular also of adjacent wind power installations, in particular of a wind park, are available and any participating wind power installation can incorporate in its own way the information provided, in particular the fault signals provided, in its own fault signal evaluation procedure, basically as desired.

In a further embodiment it is proposed the internal fault signal and/or a respective sensor signal is suppressed for a predetermined time if the internal fault signal indicates a disturbance and at least one fault signal respectively indicates a similar disturbance in the respective other wind power installation or one of the respective other wind power installations.

It is desirable to provide a general overall method used for controlling a plurality of wind power installations. At least one of the wind power installations is operated with a method at least of one of the specified embodiments. Preferably all wind power installations involving that overall control are respectively controlled with a method according to one of the described embodiments. Preferably the wind power installations exchange their fault signals with each other to be able to implement the above-described estimation procedures. That can be effected directly or by way of a control center like an SCADA. In particular at least one of the wind power installations makes at least one internal fault signal available to the other wind power installations as an external fault signal. Accordingly this involves an advantageous overall concept for control of those wind power installations.

According to the invention there is also proposed a wind power installation which has an aerodynamic rotor for producing a rotary movement from wind and also an electric generator for generating electric power from the rotary movement. For control purposes the wind power installation uses a method according to one of the described embodiments. Such a method can be implemented in the wind power installation for example on a control apparatus and/or a process computer. Accordingly the wind power installation is adapted to evaluate a disturbance with more difficulty and complication, insofar as not just an internal fault signal is taken into consideration, but further external fault signals or at least one thereof, which are produced and provided by other wind power installations.

Preferably there is proposed a wind park having a plurality of wind power installations, in which respect at least one wind power installation is designed as described hereinbefore and is operated in particular in accordance with a method of the described embodiments. The wind park is adapted to use an overall general method, in accordance with which all or at least a part of the wind power installations of the park profit from the additional information from the other wind power installations in the park. Preferably the wind power installations are coupled together for the interchange of data by way of an SCADA system. It is desirable if there is a central control which manages and/or transmits central data. A wind park is distinguished in particular in that it uses a feed-in node point common to all wind power installations for feeding electric power into an electric network.

With the described solutions it may optionally be possible to prevent the initiation of a protective measure when an internal fault signal occurs if at least one other fault signal of another wind park which indicates the same disturbance is present. In that respect it may be that that wind power installation in respect of which that fault signal first occurs assumes that the disturbance indicated thereby is present and it initiates a corresponding protective measure. Possibly therefore that wind power installation is stopped unnecessarily. It is only if—possibly a short time later—further fault signals occur from other wind power installations in relation thereto, that the assumption that the indicated disturbance is nonetheless not present becomes an obvious one. It is now possible to decide, in dependence on the situation involved, whether the wind power installation which has already been stopped—to stay with that example—starts up again or for the sake of safety remains stopped until the fault signal has been clarified.

Basically it is proposed that the information in a fault signal about an indicated disturbance is called into question on the basis of statistical considerations. It is preferably proposed that not just a single external fault signal is considered, but at least one second fault signal is taken into consideration and the presence of the disturbance indicated by the internal fault signal is to be excluded only when at least two external fault signals indicate the same disturbance. Preferably the presence of an indicated disturbance is excluded only when three external fault signals or further preferably at least four external fault signals indicate a similar disturbance in the respective other wind power installations.

In accordance with a further or alternative embodiment fault signals are taken into consideration, which are in a causal relationship between a plurality of wind power installations. They include in particular fault signals relating to situations which arise out of the positional proximity of a plurality of wind power installations. This includes in particular ice accretion detection. In the case of a plurality of wind power installations in a wind park, very similar weather conditions usually occur. If a plurality of wind power installations in a wind park detect ice accretion there is a high probability that there is an ice accretion situation generally in the wind park. Such a conclusion can also depend on how many and which wind power installations in the wind park have detected an ice accretion and ultimately it can also depend on the precision with which the ice accretion of the respective wind power installation is detected. If for example ten out of eleven wind power installations in a wind park have detected an ice accretion, there is a high probability that the eleventh wind power installation also has an ice accretion. It will be appreciated however that this does not apply if that eleventh wind power installation either has such a reliable ice accretion detection arrangement that it is possible to 100% rely thereon, or other reasons specifically in respect of that installation tell against ice accretion, such as for example a more protected position or heating which is already in operation for the rotor blades to prevent ice accretion.

Preferably, in relation to those faults which are causally related over a plurality of wind power installations, it is proposed that the associated fault signals of a plurality of wind power installations be evaluated and in particular a plurality of wind power installations of a wind park. Such evaluation preferably includes the evaluation as to how many of the investigated wind power installations, in particular how many of the installations of the wind park, are actually outputting that fault signal. As a supplemental aspect it is proposed that further details relating to the wind power installations which have outputted such a fault signal be evaluated, in particular their placement location in the wind park. Such an evaluation operation can be carried out at a wind power installation, at all wind power installations entirely or partially or at a central process computer. The result is preferably outputted in the form of a park disturbance signal and in that respect can specify for example the number of wind power installations which have such a fault signal, in particular in relation to all wind power installations of the wind park. That information can be in the form of an absolute value or can be specified as a percentage in relation to all existing wind power installations in the wind park. Preferably the park disturbance signal is outputted as a probability or a frequency for the specified fault situation in the wind park, or it is used to calculate such a probability or frequency.

In that respect it is proposed that a distinction be drawn for the same faults of different wind power installations, between those which have a causal relationship between those wind power installations and those which are not causally related. Upon the occurrence of the same fault signals of different wind power installations for faults which are not causally related, it is assumed that corresponding fault signals were wrongly outputted or that it is probable that they were wrongly outputted. Ignoring the fault signal can possibly be correspondingly justified.

For a plurality of fault signals from different wind power installations which specify an identical, causally related fault, it is assumed that it is possible to deduce therefrom at least a probability that the fault is present in still further wind power installations, possibly in all wind power installations of a wind park.

Such a causal fault concerns in particular an ice accretion and accordingly ice accretion detection or ice detection. It is preferably therefore proposed that, if one or more installations in a wind park have already been stopped, with a corresponding ice detection status, it is possible to provide, by means of a suitable function which can be referred to as park ice detection, that all other installations of the park or selected installations thereof are stopped, even if they themselves have not yet detected any ice accretion.

For that purpose the wind power installations exchange with each other by way of SCADA. In that case each status of ice accretion is transmitted to all installations in the park by SCADA at the moment of occurrence of the status once together with the number of installations in the park and the number of the installation which generated the status. Each installation stores that information of all other installations in the park in a table and upon any change in the installations in the park and the number of installation which have detected ice accretion, calculates a so-called park icing degree as a percentage.

If that park icing degree which can also form the park disturbance signal is greater than a predetermined value and in particular is greater than a value which can be specified in the control software the wind power installation which for the sake of simplicity is also referred to as the installation is stopped with an ice accretion detection status. As that status was not generated at the installation in question, that status is however not distributed to all installations and therefore also does not influence the ascertained park icing degree.

Preferably the installations which have generated an ice detection status send a corresponding message to all other installations as soon as ice accretion detection was reset. Such a status message is transmitted to all installations in the wind park by means of SCADA. Thereupon each installation deletes the ice accretion detection of the installation which generated the information that there is no longer any accretion, from its table, and again calculates the park icing degree. If that park icing degree is then less than the set limit value the installation re-starts.

If for example a limit value of 20% is set that means for example in a park with ten installations that this installation is stopped if two or more installations generate an ice detection status. To deactivate park ice detection a value of 100% has to be set for that limit value.

Preferably such values can also be manually deleted or reset to 0.

Resetting of such a park ice detection should preferably be implemented only in an exceptional case. In order to restore operation of installations which were stopped by such park ice detection, then instead of resetting the park ice detection overall ice detection should be reset at those installations which were stopped because of ice accretion. In that way the park icing degree can drop below the limit value so that the wind power installations which were stopped in dependence on that limit value can re-start.

Equally an individual installation which was stopped because of park ice detection can be restored to operation—even if it is only briefly for maintenance purposes—by the limit value being set to 100%, whereby park ice detection for that installation is notionally deactivated.

BRIEF DESCRIPTION OF THE SEVERAL VIEWS OF THE DRAWINGS

The invention is described in greater detail hereinafter by way of example by means of specific embodiments with reference to the accompanying Figures.

DETAILED DESCRIPTION

Figure 1:
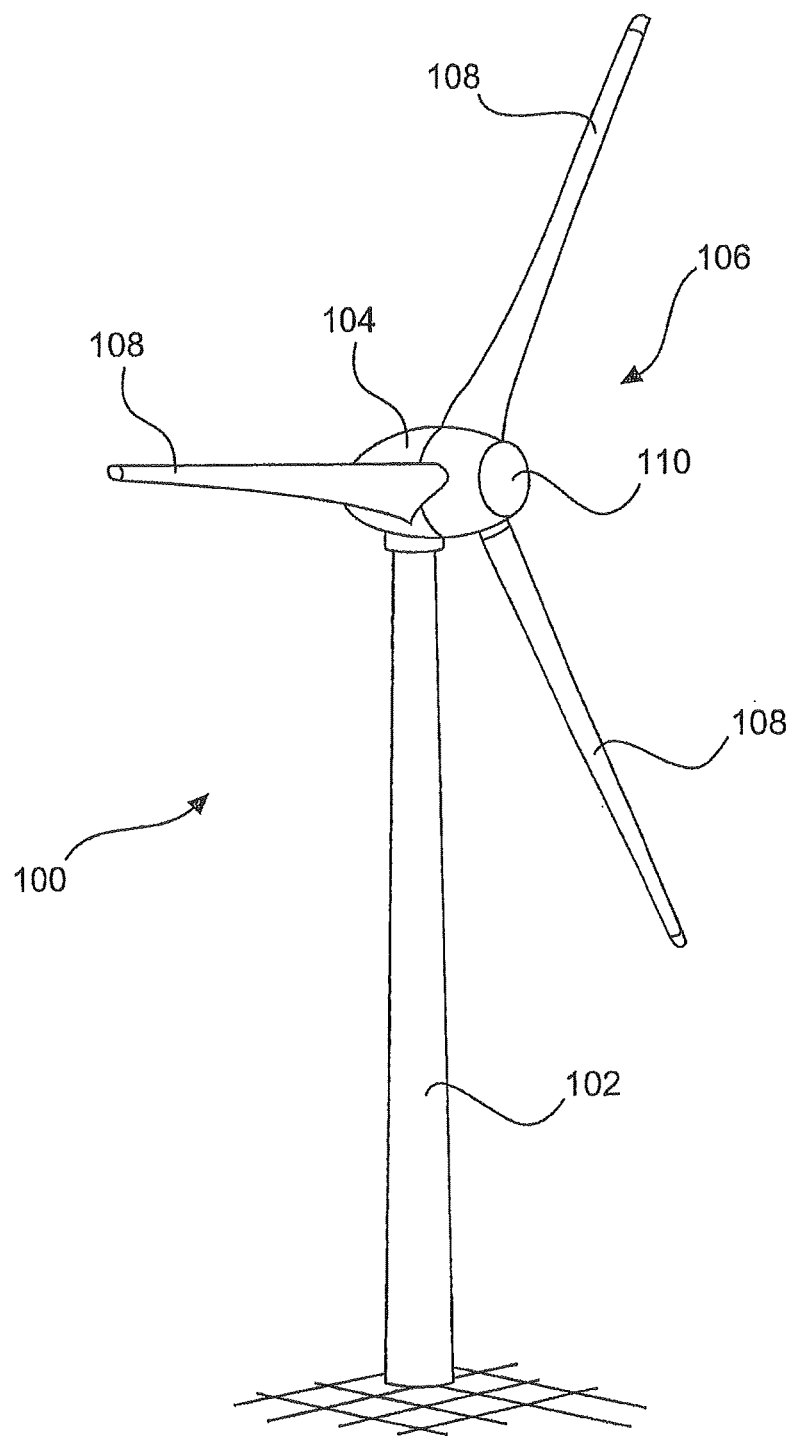
FIG. 1 shows a wind power installation which uses a method according to the invention, FIG. 2 diagrammatically shows three wind power installations connected together by way of an SCADA system for exchange and common evaluation of fault signals.

FIG. 1 shows a wind power installation 100 having a pylon 102 and a pod 104. A rotor 106 with three rotor blades 108 and a spinner 110 is arranged at the pod 104. In operation the rotor 106 is caused to rotate by the wind and thereby drives a generator in the pod 104.

Figure 2:
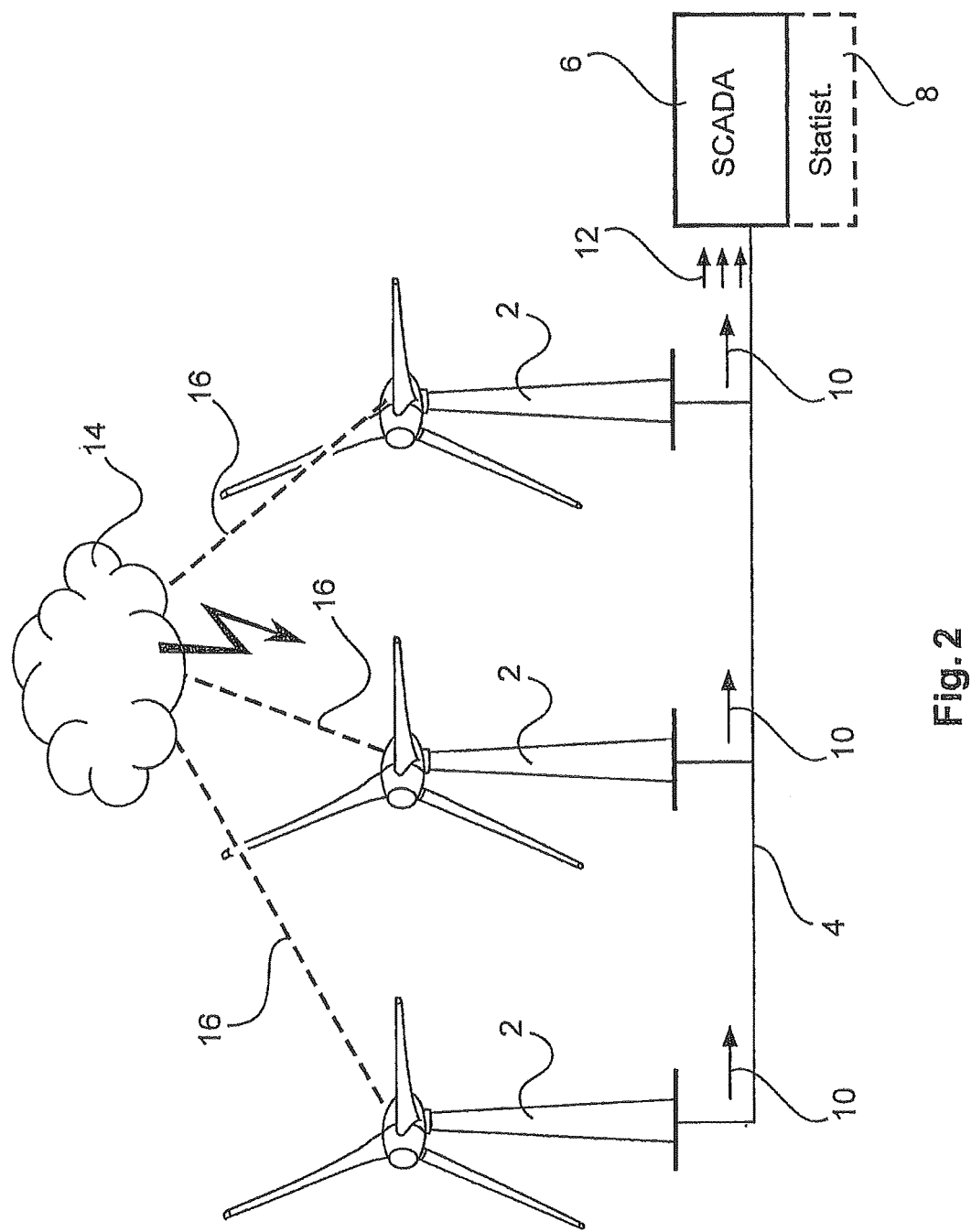

FIG. 2 diagrammatically shows three wind power installations 2 connected by way of a data control system 4 which here is of a wired nature but which can also be in the form of a radio connection. That data control system also makes a connection to a so-called SCADA system 6. The SCADA system 6 includes a statistics block 8 which is indicated here. Information like a fault signal for indicating a disturbance is respectively passed to the SCADA system 6 from the wind power installations 2. That is diagrammatically indicated in each case by the information arrow 10. The collective arrows 12 indicate that the information comes together in the SCADA system 6. A statistical evaluation can be made from the items of information by means of the block 8. That includes jointly evaluating fault signals of a plurality of wind power installations in order to establish whether those fault signals actually indicate a disturbance or whether this can be a false alarm. In that respect, for example, from the wind power installation 2 shown at the left, a fault signal is evaluated as a fault signal which is internal to that wind power installation, together with fault signals from the other two wind power installations 2 as external fault signals. The view in FIG. 2 is such that the three illustrated wind power installations 2 are illustrated as being functionally equally authorized. Accordingly, depending on the respective situation, namely depending on where firstly a fault signal occurs, each of the wind power installations 2 can be the wind power installation that is first in accordance with the foregoing description and which provides an internal fault signal. The remaining other two wind power installations can each be in the illustrated example the respective other wind power installations which each supply an external fault signal.

The evaluation is so illustrated in FIG. 2 that it is performed in the SCADA system 6. Equally evaluation can be respectively performed in the wind power installation. At any event an SCADA system is used at least for information transmission, preferably also for information evaluation.

FIG. 2 also shows a thundercloud 14. If that thundercloud 14 results in a flash of lightening with accompanying thunder then that thunder can produce such a loud noise that in all the illustrated wind power installations 2 it triggers a noise sensor which at any event, that is to say in each of the wind power installations 2, produces a corresponding fault signal. The dashed lines of action 16 are intended to show that the thunder acts on each of the wind power installations 2. In this illustrated example each of the wind power installations 2 then produces a corresponding fault signal so that overall three fault signals are produced and are jointly evaluated in the SCADA system 6. In this illustrated example, the situation involving an effect thereon is that three wind power installations 2 have respectively produced at the same time a fault signal caused by a loud noise. In these examples it is concluded therefrom that this is not likely to be an installation defect such as a loose part which triggers a crashing noise, but rather be related to a phenomenon which is effective at the same time for all three wind power installations 2. By additional evaluation of a weather report, either automated or manually by a person, the suspicion can be strengthened that no disturbance is involved and rather a gathering thunderstorm must be the reason for the triggering of the noise sensors.

This is based on the realization that it is improbable that all three wind power installations 2 are suffering at the same time from a technical damage which causes the noise sensors to be triggered. Even if the noise sensor in one of those three wind power installations 2 sounds first because the thunder for example is closer to that installation, that installation is possibly shut down for the sake of safety but, after the reception of further fault signals, it is apparent from probability considerations that such a fault cannot be present everywhere and accordingly not all wind power installations are shut down and also do not have to be correspondingly manually re-started. That can increase their availability. Following that situation, the wind power installation that was shut down first can possibly also be re-started. That can be effected manually or in an automated procedure, depending on the respective embodiment involved.

This thunder with possible noise-motivating fault signals is only an example. Other phenomena and other fault signals can be correspondingly treated.

Figure 3:
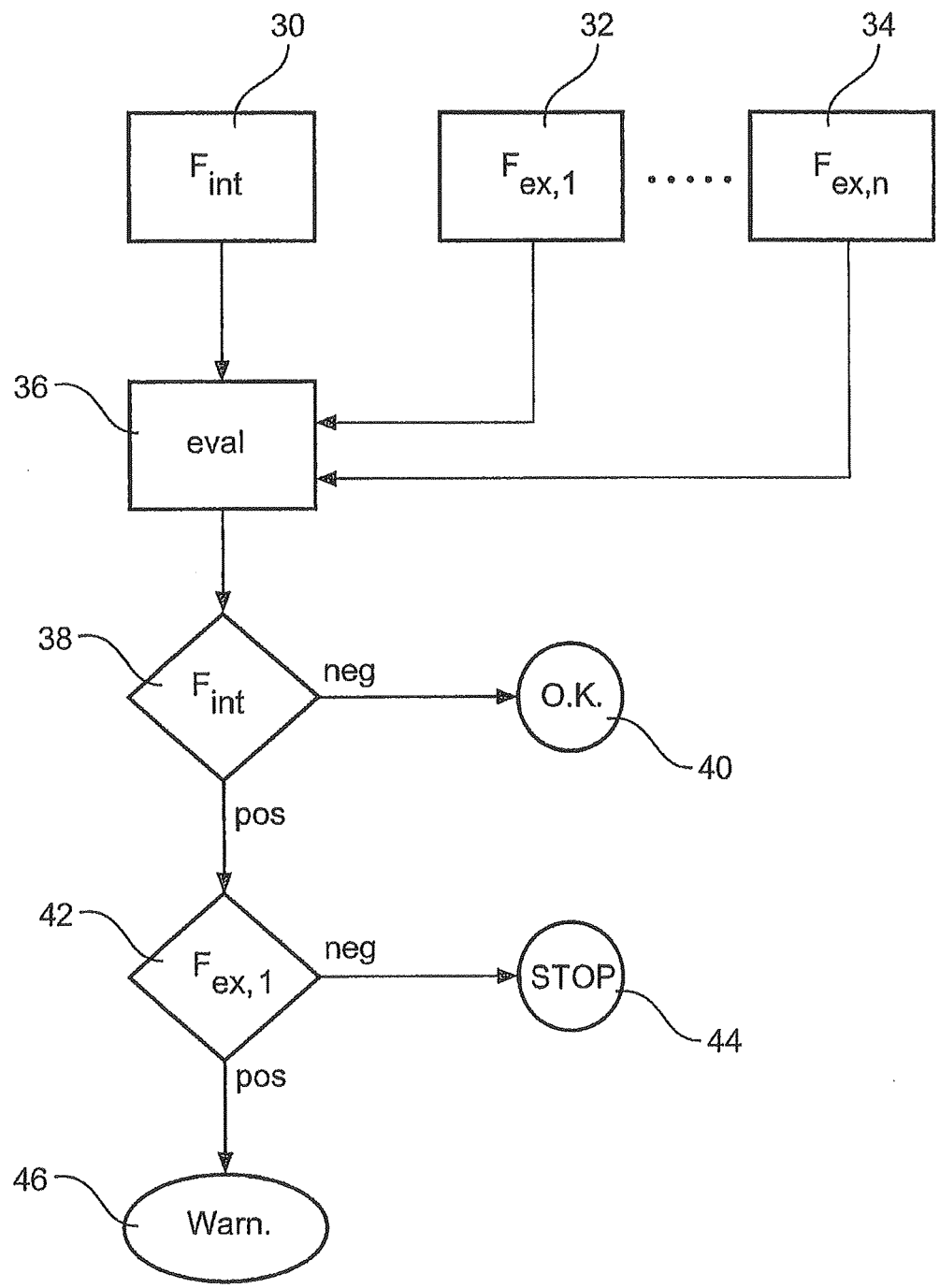
FIG. 3 shows a flow chart of an embodiment for controlling a wind power installation.

FIG. 3 shows in simplified form a flow chart of a proposed assessment in accordance with an embodiment. In accordance therewith an internal fault signal ($F_{int}$) of a first wind power installation is recorded in the block 30. The blocks 32 and 34 show that basically any number of further external fault signals ($F_{ex,1}$ to $F_{ex,n}$) can be received. Basically this depends on the number of wind power installations available in that respect. The example in FIG. 3 thus concerns n+1 wind power installations, namely the first one and n further ones.

The fault signals, namely both the internal fault signal and also the external ones, are brought together in the evaluation block 36. It is to be noted that in the illustrated example it is assumed there is a fault signal which is always present but which by virtue of its value first indicates whether there is or is not a disturbance. For example in that respect the fault signals can each assume the value zero for no fault and 1 for the assumption of a disturbance. Alternatively transmission of a fault signal first occurs at all when there is a fault situation.

The items of information which are brought together in that way are then initially evaluated in the query block 38 for the internal fault signal ($F_{int}$). If the evaluation is negative, that is to say there is no fault signal for the first wind power installation, then everything is OK and the procedure branches to the first output block 40 which at this point discontinues the evaluation at any event for the first wind power installation and possibly outputs an OK signal. The output of the signal however is not an important consideration as rather it is only in the fault situation that there is a need for action.

If the result of the first query block 38 is positive and therefore there is a fault signal for the first wind power installation, a further query is made in the second query block 42. Here a check is made to ascertain whether at least one of the external fault signals ($F_{ex,1}$ to $F_{ex,n}$) also indicates a similar fault or a similar disturbance.

If that is not the case it is concluded therefrom that there is actually a disturbance in the first wind power installation and the installation is thus stopped, as indicated by the protection block 44. The installation can be suitably stopped, still other or additional measures can also be considered.

If in contrast the result in the second query block 42 is positive and there is therefore at least one external fault signal indicating the same disturbance in another wind power installation like the first fault signal in the first wind power installation, no protective measure is undertaken, at least not directly, but instead a warning is delivered in accordance with warning block 46. That warning can be subjected to further processing in the SCADA system and it is optionally possible to decide later whether a false warning was definitively assumed to occur on the basis of further information or whether the first wind power installation must nonetheless be stopped or other protective measures have to be taken.

In the query block 42 a query can also be made such that at least two or at least three or at least four external fault signals, that is to say corresponding to many other wind power installations, must indicate the same disturbance as the internal fault signal, in order to finally branch to the warning block 46 and not to the protection block 44.

The chart shown in FIG. 3 can basically be implemented in succession or parallel for each wind power installation of the wind power installation array considered, in particular a corresponding wind park.

In accordance with the invention therefore the informative value of any fault signals is improved in a simple fashion, in particular without additional hardware complication and expenditure, by way of a statistical evaluation. Many unwanted installation stoppages can be avoided.

Thus false measurements or false evaluations can be corrected by statistically ascertained probabilities over a plurality of installations in a wind park. Stoppage times of installations, triggered by a false alarm from such a false measurement, can be avoided.

For that purpose the central SCADA system detects all conditions of all installations in a wind park. Those required data can also be referred to as status data. Selected conditions are statistically detected, more specifically in particular as the number of installations involving the same condition at the same moment in time, and sent back to the installations as statistics. The autonomous installation control systems can thus avoid false alarms, with implementation of the statistics. The SCADA system thus provides a data compilation and database setting, in which respect however it is respectively left to the wind power installation itself, what consequences it must draw therefrom. In accordance with a design configuration therefore, with implementation of the statistics, autonomous installation control systems present in the installations can avoid false alarms or use the conditions of other installations and appropriately react thereto.

There is provided an inexpensive solution as only a one-off software involvement is required.

For further description attention is directed once again to the following specific examples:

In the case of severe thunderstorms and hailstorms with extremely large hailstones the noise sensors in the state of the art are wrongly triggered. To provide a remedy here information exchange between the installations in the park by means of SCADA is proposed.

As soon as an installation transmits a corresponding item of information such as for example "noise detected in the spinner" to SCADA, which usually precedes a corresponding status 50:14 ("noise in spinner"), that information is sent back directly to all installations in the park by SCADA. Therefore each installation has the possible option of detecting whether noise sensors of other installations in the park have also responded, within a given period of time.

If for example two installations in a park with two or three installations or three or more installations in larger parks detect noises within 30 minutes, the noise sensors of all installations in the park are deactivated for at least 30 minutes. All installations generate status information "noise sensor deactivated". 30 minutes after the last noise was detected by an installation or after a maximum of 5 hours the noise sensors are re-activated. Here, in principle it is also possible to use other time values instead of the stated 30 minutes or also instead of the stated 5 hours. All installations then transmit the information "noise sensor activated" to SCADA. If necessary it is possible to establish by means of those items of information when and how long noise sensors were deactivated.

If because of a thunderstorm or a hailstorm, an installation should already have been shut down with the above-mentioned status 50:14 before a sufficient number of other installations have also detected noise in the spinner, then in relation to that installation the so-called reset block is cancelled again and the disturbance acknowledged. The installation now automatically goes back into operation again with deactivated noise sensor. It will be noted however that a prerequisite for this is that the specified status 50:14 prevails for no longer than 30 minutes. Then more specifically it must be assumed that there is another cause for the status.

The reset block prevents the installation being restored to operation by the operator. The reset block can be cancelled by a service employee after the input of a service code.

False triggerings caused by thunderstorms should be substantially excluded in the future by those measures. For individual installations this proposed change in the control system is basically without any effect so that a software implementation can basically be generally proposed without having to take account of whether the installation is to be set up as an individual installation or in a park. Accordingly the result of this can be at most that occasional incorrect triggerings at individual installations would possibly have to be tolerated in the event of thunderstorms.

As a further example attention is directed to previously existing problems with smoke detectors. Due to very fine ice crystals and desert dust false triggerings of smoke detectors in the pod can repeatedly occur in the state of the art at some installation locations. For that purpose also it is proposed that information exchange between the installations in a park is basically still to be implemented by means of SCADA as with the above-described noise sensors.

As soon as here an installation transmits the status "smoke detector (hatch)" or "smoke detector (spinner)" to SCADA that information is sent back or distributed directly to all installations in the park by SCADA. Thus each installation enjoys the option of determining whether smoke detectors of other installations in the park have also responded within a given period of time.

If smoke detectors respond within 5 hours at two installations in a park having two or three installations or at three or more installations in larger parks, the two smoke detectors at the hatch and the spinner are deactivated in all installations in the park for 24 hours. All installations then generate the information "smoke detectors: hatch and spinner deactivated". After the expiration of the 24 hour period, the smoke detectors are activated again for at least 6 hours, with the information "smoke detectors: hatch and spinner activated". Those times can also be varied. That prevents a plurality of for example defective smoke detectors in a park permanently deactivating the smoke detectors of all installations.

As deactivation of the smoke detectors preferably only occurs when two or three installations of the status "automatic deactivation of the smoke detectors" have already shut down, the reset block at that installation is cancelled again and the disturbance acknowledged. The installation now goes automatically into operation again with deactivated smoke detectors. It will be appreciated however that a prerequisite in that respect is that the status "automatic deactivation of the smoke detectors" does not occur for longer than 5 hours. In that case more specifically it must be assumed that there is another cause for the status.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of controlling a first wind power installation, the method comprising:
   detecting an internal fault signal produced in the first wind power installation, the internal fault signal indicating a first disturbance in the first wind power installation, wherein the first disturbance is indicative of at least one of a fire in the first wind power installation and a failure of a component in operation of the first wind power installation;
   receiving at least one external fault signal produced outside of the first wind power installation, the at least one external fault signal indicating a second disturbance in a second wind power installation, wherein the second disturbance is indicative of at least one of a fire in the second wind power installation and a failure of a component in operation of the second wind power installation;
   evaluating the internal fault signal in dependence on the at least one external fault signal, and
   after evaluating the internal fault signal, determining that the internal fault signal is a false alarm indicating that the first disturbance in the first wind power installation is not present when the internal fault signal and the at least one external fault signal indicate that the first disturbance is similar to the second disturbance.

2. The method according to claim 1 wherein at least one protective measure for protecting the first wind power installation is initiated in dependence on the internal fault signal and in dependence on the at least one external fault signal.

3. The method according to claim 1 the method further comprising:
   stopping the first wind power installation when the internal fault signal and the at least one external fault signal do not indicate that the first disturbance is similar to the second disturbance, and
   initiating a warning signal when the internal fault signal and the at least one external fault signal indicate that the first disturbance is similar to the second disturbance.

4. The method according to claim 1 further comprising generating a warning signal when evaluating the internal fault signal indicates the first disturbance and the second disturbance are similar, the method further comprising sending a signal indicative of two disturbances in two separate wind power installations to a control center.

5. The method according to claim 4 wherein at least one of the warning signal and a transmission of the at least one external fault signal is effected by a SCADA system.

6. The method according to claim 1 wherein at least one of the internal fault signal and a sensor signal is suppressed for a predetermined time when evaluating the internal fault signal in dependence on the at least one external fault signal indicates the first disturbance and the second disturbance in the second wind power installation are similar.

7. The method according to claim 1 wherein evaluating the internal fault signal comprises determining whether ice accretion on the a rotor blade is present, wherein ice accretion is determined to be present when the first disturbance indicates ice accretion on a rotor blade of the first wind power installation and the second disturbance indicates ice accretion on a rotor blade of the second wind power installation, the method further comprising generating a park disturbance signal that indicates to further wind power installations that there is a disturbance involving ice accretion.

8. A method of controlling a plurality of wind power installations, wherein at least one of the wind power installations is controlled with the method according to claim 1, the method further comprising:
a second wind power installation detecting the at least one internal fault signal and sending the at least one internal fault signal to the first wind power installation as the at least one external fault signal.

9. The method according to claim 8 wherein in the presence of a fault signal relating to a fault condition, at least two wind power installations that have not produced a fault signal are placed into the fault condition and a park disturbance signal is produced and transmitted to at least one of the wind power installations that did not produced a fault signal.

10. A wind power installation comprising:
an aerodynamic rotor for producing a rotary movement from wind,
an electric generator for generating electric power from the rotary movement, wherein the wind power installation is adapted for control by the method according to claim 1.

11. A wind park comprising a plurality of wind power installations and at least one wind power installation according to claim 10.

12. The method according to claim 2, wherein the at least one protective measure for protecting the first wind power installation is stopping the first wind power installation.

13. The method according to claim 1, wherein the internal fault signal indicates at least one of ice accretion on a blade of the first wind power installation, smoke in a pod of the first wind power installation, noise above a threshold decibel in the pod of the first wind power installation.

14. The method according to claim 1, wherein evaluating the internal fault signal in dependence on the at least one external fault signal comprises comparing the internal fault signal to the at least one external fault signal.

15. The method according to claim 1, wherein the at least one external fault signal is produced in the second wind power installation.

16. The method according to claim 3, wherein when initiating the warning signal a protective measure is not initiated.

\* \* \* \* \*